United States Patent
Kim

(10) Patent No.: US 9,522,632 B2
(45) Date of Patent: Dec. 20, 2016

(54) METHOD AND DEVICE FOR PROVIDING INFORMATION ABOUT FAILURE IN VIRTUAL ENGINE SOUND SYSTEM UNIT FOR VEHICLE

(71) Applicant: Hyundai Motor Company, Seoul (KR)

(72) Inventor: Young Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/719,800

(22) Filed: May 22, 2015

(65) Prior Publication Data

US 2016/0152183 A1 Jun. 2, 2016

(30) Foreign Application Priority Data

Nov. 27, 2014 (KR) .......................... 10-2014-0167640

(51) Int. Cl.
*B60Q 11/00* (2006.01)
*H04R 29/00* (2006.01)
*B60Q 5/00* (2006.01)
*B60Q 9/00* (2006.01)

(52) U.S. Cl.
CPC ............... *B60Q 11/00* (2013.01); *B60Q 5/008* (2013.01); *B60Q 9/00* (2013.01); *H04R 29/001* (2013.01)

(58) Field of Classification Search
None
See application file for complete search history.

(56) References Cited

U.S. PATENT DOCUMENTS

| | | | | |
|---|---|---|---|---|
| 7,650,001 B2* | 1/2010 | Yasushi | .................. | B60Q 5/008 381/61 |
| 7,979,147 B1* | 7/2011 | Dunn | .................... | G10K 15/02 181/192 |
| 8,537,030 B2* | 9/2013 | Perkins | .................. | B60Q 1/506 340/425.5 |
| 8,860,585 B2* | 10/2014 | Tsuzuki | ................. | G08G 1/166 340/425.5 |
| 9,060,218 B2* | 6/2015 | Itou | ........................ | H04R 3/007 |
| 9,106,990 B2* | 8/2015 | Nyu | ....................... | H04R 3/007 |
| 9,189,452 B2* | 11/2015 | Hahne | ..................... | G06F 17/00 |
| 2010/0228434 A1* | 9/2010 | Leyerle | .................. | B60Q 5/008 701/36 |
| 2011/0044470 A1* | 2/2011 | Ogata | ..................... | B60R 21/34 381/86 |
| 2012/0179280 A1 | 7/2012 | Faye | | |

(Continued)

FOREIGN PATENT DOCUMENTS

| | | | |
|---|---|---|---|
| JP | 3848601 B2 | 11/2006 | |
| KR | 20-1999-0024923 U | 7/1999 | |

(Continued)

OTHER PUBLICATIONS

English machine translation of KR20100068803, Jun. 2010.*

*Primary Examiner* — Paul Huber
(74) *Attorney, Agent, or Firm* — Mintz Levin Cohn Ferris Glovsky and Popeo, P.C.; Peter F. Corless

(57) ABSTRACT

A method for providing information about a failure in a virtual engine sound system (VESS) unit for a vehicle includes sending a VESS unit failure message to a cluster, and displaying the failure message on the cluster. In the unit failure information providing method, VESS unit failure information may be provided by the use of a navigation unit or electric/electronic subassemblies.

18 Claims, 8 Drawing Sheets

(56) References Cited

U.S. PATENT DOCUMENTS

2014/0300455 A1* 10/2014 Tsuzuki ................ B60Q 5/008
340/425.5

FOREIGN PATENT DOCUMENTS

| KR | 10-2006-0058793 A | 6/2006 |
| KR | 10-2010-0068803 A | 6/2010 |
| KR | 10-2011-0122343 A | 11/2011 |
| KR | 10-2013-0058995 A | 6/2013 |
| KR | 10-2014-0080317 A | 6/2014 |

* cited by examiner

METHOD AND DEVICE FOR PROVIDING INFORMATION ABOUT FAILURE IN VIRTUAL ENGINE SOUND SYSTEM UNIT FOR VEHICLE

CROSS-REFERENCE TO RELATED APPLICATION

This application claims priority to and the benefit of Korean Patent Application No. 10-2014-0167640 filed in the Korean Intellectual Property Office on Nov. 27, 2014, the entire contents of which are incorporated herein by reference.

BACKGROUND OF THE DISCLOSURE (a) Technical Field

The present disclosure relates generally to a virtual engine sound system (VESS)-related technology, and more particularly, to a method and device for providing information about a failure in a virtual engine sound system unit for a vehicle which can raise drivers' or pedestrians' awareness of a failure in the VESS unit.

(b) Description of the Related Art

Electric vehicles are generally considered to be environmentally-friendly and are powered by an AC or DC motor driven primarily by battery power. Electric vehicles include both battery-only electric vehicles and hybrid electric vehicles. The battery-only electric vehicle uses a motor driven by battery power and recharges the battery when the power is depleted, whereas the hybrid electric vehicle generates electricity by powering an engine, charges a battery with the generated electricity, and uses an electric motor driven by the electricity to propel the vehicle. Hybrid electric vehicles may be classified into two types: series and parallel. The series type of hybrid electric vehicle is made by adding an engine and a generator to a conventional electric vehicle to increase mileage and is driven by a motor, as mechanical energy from an engine is converted to electric energy through a generator. This electric energy is then supplied to a battery or motor. On the other hand, the parallel type of hybrid electric vehicle uses the battery and/or the engine (e.g., gasoline or diesel) as power sources.

However, environmentally-friendly vehicles, as those described above, typically make very little noise while running in an electric vehicle running mode, i.e., a mode in which a vehicle runs on a motor, and can make it difficult for pedestrians (particularly visually-impaired people) to be aware of the approaching vehicles, thereby causing accidents. To overcome this, environmentally-friendly vehicles can be equipped with virtual engine sound systems (VESS) that reproduce and emit virtual sounds through speakers to make it easy for pedestrians to be aware of the approaching vehicles. The VESS speakers are often installed at the front bumper to mimic engine or motor sounds.

The above information disclosed in this Background section is only for enhancement of understanding of the background of the disclosure and therefore it may contain information that does not form the related art that is already known in this country to a person of ordinary skill in the art.

SUMMARY OF THE DISCLOSURE

The present disclosure has been made in an effort to provide a method and device for providing information about a failure in a virtual engine sound system (VESS) unit for a vehicle which can raise drivers' or pedestrians' awareness of a failure in the VESS unit by the use of a navigation system or electric/electronic subassemblies.

Embodiments of the present disclosure provide a method for providing information about a failure in a virtual engine sound system (VESS) unit for a vehicle, the method including: sending a VESS unit failure message to a cluster, and displaying the VESS unit failure message on the cluster.

The VESS unit failure information providing method may further include providing a diagnoser with a diagnostic trouble code (DTC), which is recognizable by a car repair shop, corresponding to the VESS unit failure message before sending the VESS unit failure message to the cluster.

The VESS unit failure information providing method may further include displaying, by a navigation unit of the vehicle, a VESS unit failure warning screen included in the VESS unit failure message when the vehicle speed is within a speed range where the VESS unit is active.

The VESS unit failure information providing method may further include turning on headlamps of the vehicle when the vehicle enters an area in which the vehicle must travel within a speed range where the VESS unit is active.

The VESS unit failure information providing method may further include emitting a warning sound through a buzzer in the vehicle when the VESS unit issues a failure message after the turning on of the headlamps.

The VESS unit failure information providing method may further include boosting a pressure of a vehicle engine sound emitted from the VESS unit when the VESS unit does not send a failure message after the turning on of the headlamps.

The VESS unit failure information providing method may further include emitting a warning sound through a buzzer in the vehicle when a front sensor unit or a rear sensor unit of the vehicle detects an object outside of the vehicle while the vehicle is traveling within a speed range in which the VESS unit is active.

The front sensor unit may include a plurality of motion sensors located at a front of the vehicle, and the object may be detected as moving when at least two of the plurality of motion sensors detect the object.

A navigation unit of the vehicle may display route information for directing the vehicle to a car repair shop when the VESS unit sends the VESS unit failure message.

The sending of the VESS unit failure message may include sending the VESS unit failure message to the cluster when a disconnection of wires connecting the VESS unit to speakers occurs.

Furthermore, according to embodiments of the present disclosure, a device for providing information about a failure in a virtual engine sound system (VESS) unit for a vehicle includes: a VESS unit emitting a virtual engine sound and sending a VESS unit failure message; and a cluster receiving the VESS unit failure message from the VESS unit through a central gateway (GCW) and displaying the VESS unit failure message.

The VESS unit failure information providing device may further include a diagnoser that receives a diagnostic trouble code (DTC), which is recognizable by a car repair shop, corresponding to the VESS unit failure message before sending the failure message to the cluster.

The VESS unit failure information providing device may further include a navigation unit that displays a VESS unit failure warning screen included in the VESS unit failure message sent by the VESS unit when the vehicle speed is within a speed range where the VESS unit is active.

The VESS unit failure information providing device may further include a navigation unit that displays route information for directing the vehicle to a car repair shop when the VESS unit sends the VESS unit failure message.

The VESS unit may cause headlamps of the vehicle to be turned on when the vehicle enters an area in which the vehicle must travel within a speed range where the VESS unit is active.

The VESS unit may cause a warning sound to be emitted through a buzzer in the vehicle when the VESS unit sends a VESS unit failure message after the turning on of the headlamps.

The VESS unit may boost pressure of a vehicle engine sound when the VESS does not send a VESS unit failure message after the turning on of the headlamps.

Furthermore, according to embodiments of the present disclosure, a non-transitory computer readable medium containing program instructions for providing information about a failure in a virtual engine sound system (VESS) unit for a vehicle includes: program instructions that send a VESS unit failure message to a cluster; and program instructions that display the VESS unit failure message on the cluster.

The above-described method and device for providing information about a failure in a virtual engine sound system unit for a vehicle can raise drivers' or pedestrians' awareness of a failure in the VESS unit by the use of a navigation system or electric/electronic subassemblies. Additionally, the driver or user to may be led to perceive any failure (i.e., error) in the VESS unit, such as a disconnection of wires between the VESS unit and speakers, may drive carefully at a low speed as a result, and finally direct the vehicle to a vehicle after-sales-service center (i.e., car repair shop) to repair the VESS unit. Furthermore, the present disclosure can increase the safety of pedestrians and encourage drivers to drive with care, thereby avoiding the risk of vehicle accidents and preventing product liability claims arising from these accidents.

BRIEF DESCRIPTION OF THE DRAWINGS

In order to more fully understand the drawings used in the detailed description of the disclosure, a brief description of the drawings is provided.

DETAILED DESCRIPTION OF THE EMBODIMENTS

Figure 1:
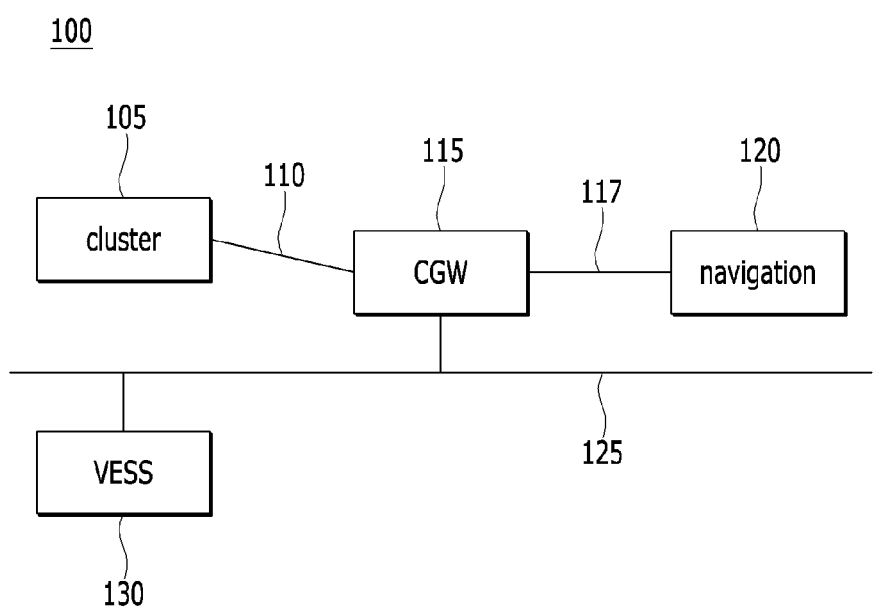
FIG. 1 is a view for explaining a device for providing information about a failure in a VESS unit for a vehicle according to embodiments of the present disclosure.

For better understanding of the present disclosure, and to show more clearly how it may be carried into effect, reference will now be made, by way of examples, to the accompanying drawings which show embodiments of the present disclosure.

Hereinafter, embodiments of the present disclosure will be described in detail with reference to the accompanying drawings. In describing the embodiments of the present disclosure, a detailed description of pertinent known constructions or functions will be omitted if it is deemed to make the gist of the present disclosure unnecessarily vague. Wherever possible, the same reference numbers will be used throughout the drawings to refer to the same or like parts.

The terms used in the specification are used to describe only specific embodiments and are not intended to limit the present disclosure. Singular forms are intended to include plural forms unless the context clearly indicates otherwise. It will be further understood that the terms "include", "comprise", or "have" used in this specification specify the presence of stated features, steps, operations, components, parts, or a combination thereof, but do not preclude the presence or addition of one or more other features, numerals, steps, operations, components, parts, or a combination thereof.

Unless indicated otherwise, it is to be understood that all the terms used in the specification including technical and scientific terms has the same meaning as those that are understood by those who are skilled in the art. It must be understood that the terms defined by the dictionary are identical with the meanings within the context of the related art, and they should not be ideally or excessively formally defined unless the context clearly dictates otherwise.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Referring now to the disclosed embodiments, a virtual engine sound system (VESS), i.e., a unit (or device) that emits engine sounds outside the vehicle, is incorporated in electric vehicles, hybrid electric vehicles, fuel cell electric vehicles, or the like. The VESS is mounted for safety of pedestrians. Recently, draft legislation requiring mandatory use of the VESS system for all electric vehicles has been published in the United States. Even if the VESS is made compulsory, drivers or users cannot be made aware of (i.e., perceive) a failure in the VESS because sounds are not delivered into the vehicle in the case of a VESS failure, such as a disconnection of wires between the VESS and a speaker.

FIG. 1 is a view for explaining a device for providing information about a failure in a VESS unit for a vehicle according to embodiments of the present disclosure.

As shown in FIG. 1, a VESS unit failure information providing device 100 included in a vehicle may include a cluster 105 (e.g., an electronic instrument cluster or panel for displaying instrumentation information, such as a speedometer, odometer, HVAC status, etc.), a central gateway (CGW) 115, a navigation unit (or navigation device) 120, a VESS unit 130, and controller area networks (CANs) 110, 117, and 125, which are vehicle networks. The CAN communication networks may use the gateway 115 to share data among controllers connected to respective networks including a Body CAN (B-CAN), a Multimedia CAN (M-CAN), a Chassis CAN (C-CAN), a P-CAN, etc.

The VESS unit 130 may be connected to the CGW 115 through a P-CAN line 125, the cluster 105 may be connected to the CGW 115 through a C-CAN line, and the navigation unit 120 may be connected to the CGW 115 through an M-CAN line 117. Electric/electronic subassemblies (e.g., controllers) in the vehicle may be connected to the P-CAN line 125.

The cluster 105 may display vehicle state information, alarm information, or dashboard information to the driver. The central gateway 115 may serve to pass CAN communication messages between networks separated from each other.

The VESS unit 130 may emit a virtual engine sound for safety of pedestrians when the vehicle travels at a speed of, for example, 0 to 30 km per hour (i.e., up to 30 km/h). However, if the VESS unit 130 makes no sound due to system failure, an accident may occur to pedestrians, especially visually impaired people. In this instance, the finished vehicle manufacturer may have to pay compensation to the pedestrians according to product liability law. In case of a failure in the VESS unit 130, the VESS unit 130 may send a failure message to the CGW 115 through the P-CAN line 125. Then, the CGW 115 may pass the failure message to the navigation unit 120 and the cluster 105.

Figure 2:
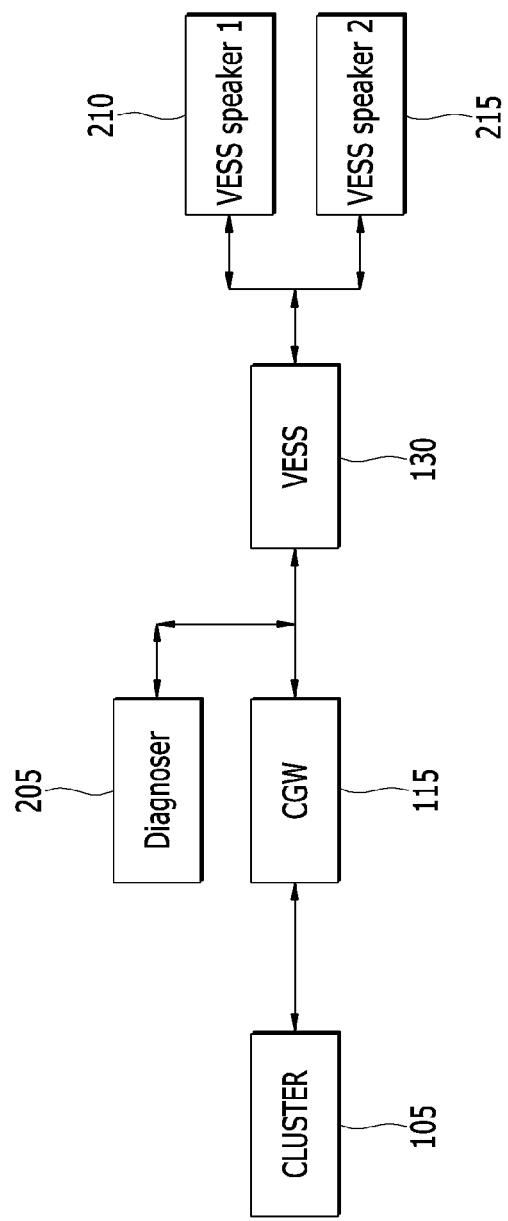
FIG. 2 is a view for explaining an example of the VESS unit failure information providing device of FIG. 1.

FIG. 2 is a view for explaining an example of the VESS unit failure information providing device of FIG. 1.

As shown in FIG. 2, the VESS unit 130 may provide a diagnoser 205 contained in the vehicle (or the VESS unit failure information providing device of the vehicle) with a diagnostic trouble code (DTC) corresponding to a failure message, before sending the failure message to the CGW 115. The diagnostic trouble code may be, for example, a numeric code that can be recognized by a car repair shop.

Figure 3:
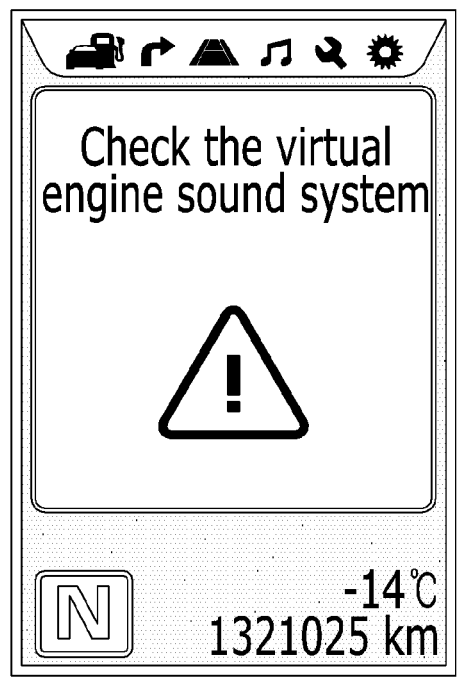
FIG. 3 is a view showing a failure message displayed by the cluster of FIG. 1 or FIG. 2.

Once the CGW 115 passes the failure message to the cluster 105, the cluster 105 may display a failure message regarding the VESS unit, as shown in FIG. 3. Failures (e.g., errors) in the VESS unit may include communication errors, speaker errors, or VESS errors. The communication errors may include P-CAN errors, C-CAN errors, or timeout errors. The VESS unit 130 (or a controller contained in the VESS) may check a CAN signal for, e.g., the first five seconds to meet a CAN stabilization condition. If the VESS unit 130 gets no response from the networks for five seconds, it may display an error on a display device (not shown).

The controller may perform a processor's functions, and control the overall operations of the cluster 105, the VESS unit 130, the CGW 115, the navigation unit 120, and speakers 210 and 215 contained in the VESS unit failure information providing device of the vehicle. The controller may include a program containing a series of commands for performing a VESS unit failure information providing method of this disclosure. The controller may be located outside the VESS unit 130.

The speaker errors may include errors regarding disconnection of wires connecting the VESS unit 130 and a speaker 210 or 215, and detachment of a connector connecting the VESS unit and a speaker 210 or 215. If errors occur in succession while a power integrated circuit (IC) in the VESS unit 130 is monitoring speaker errors for five seconds (i.e., 250 ms per session; 20 sessions in total), the power IC may send an error message (e.g., failure message). The power IC may be contained in the controller of the VESS unit 130. If a disconnection or connector detachment occurs to only one speaker 210 or 215, the amplifier driver IC (e.g., power IC) cannot determine whether the disconnection or connector detachment has occurred or not. This is because the two speakers 210 and 215 are connected to one channel, as shown in FIG. 2.

The VESS errors include errors (e.g., failures) that the controller detects as failures in the VESS itself, which may include malfunctions of the internal memory and central processing unit (CPU) of the VESS unit 130, or errors arising from communication failures within the VESS unit. When the system returns to normal within the five-second duration of monitoring by the VESS unit, the controller may determine that no error has occurred.

Figure 4:
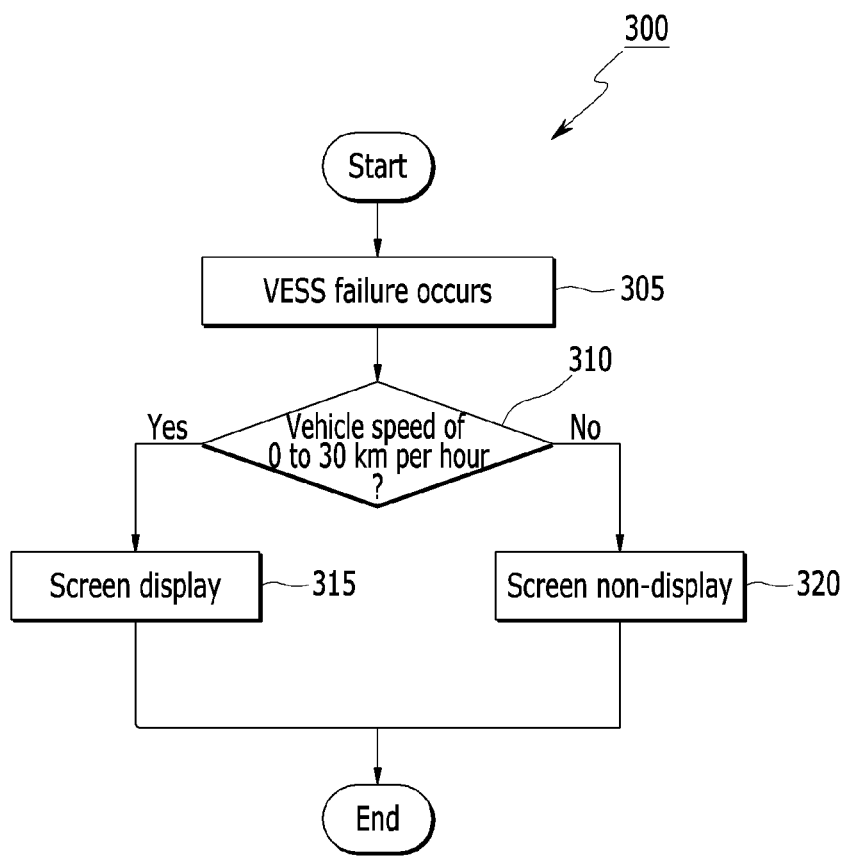
FIG. 4 is a flowchart showing a method for providing information about a failure in a VESS unit for a vehicle, explained with reference to FIG. 1 or FIG. 2, according to embodiments of the present disclosure.

FIG. 4 is a flowchart showing a method for providing information about a failure in a VESS unit for a vehicle, explained with reference to FIG. 1 or FIG. 2, according to embodiments 300 of the present disclosure. The VESS unit failure information providing method 300 may be applied to either of the VESS unit failure information providing device 100 and the VESS unit failure information providing device of FIG. 2.

As shown in FIG. 4, in a failure occurrence step S305, a failure may occur in the VESS unit 130 explained above with reference to FIG. 1 or FIG. 2.

In a vehicle speed check step 310, the VESS unit 130 (or the controller of the VESS unit 130) may determine whether or not the vehicle speed is within a speed range where the VESS unit 130 is active (e.g., at a speed of up to 30 km per hour). When the vehicle travels at a speed of up to 30 km per hour, a process corresponding to the VESS unit failure information providing method 300 may proceed to a screen display step 315. Otherwise, the process may proceed to a screen non-display step 320.

In the screen display step 315, the navigation unit 120 may display a VESS unit failure warning screen that is contained in the failure message sent by the VESS unit 130 through the CGW 115.

Figure 5:
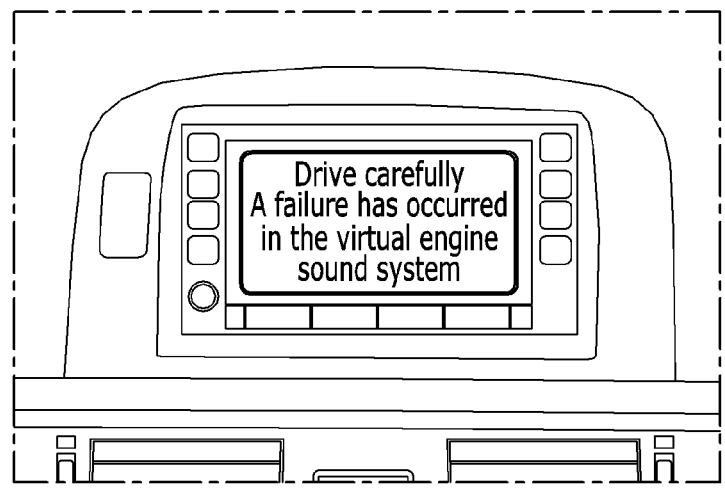
FIG. 5 is a view showing an example of a VESS unit failure warning screen displayed by the navigation unit of FIG. 1.

In the screen non-display step 320, the navigation unit 120 may not display a VESS unit failure warning screen that is contained in the failure message sent by the VESS unit 130 through the CGW 115. More specifically, when the vehicle travels at a speed of 0 to 30 km per hour, which is required to activate the VESS, a warning screen saying "Drive carefully. A failure has occurred in the virtual engine sound system." illustrated in FIG. 5 may be displayed for safety of pedestrians.

Additionally, the navigation unit 120 may provide the driver with route information for directing the vehicle to a car repair shop or a vehicle after-sales service (AS) center where the driver can get the VESS unit 130 repaired. That is, when the VESS unit 130 issues a failure message, the vehicle's navigation unit 120 may display route information for directing the vehicle to a car repair shop.

Figure 6:
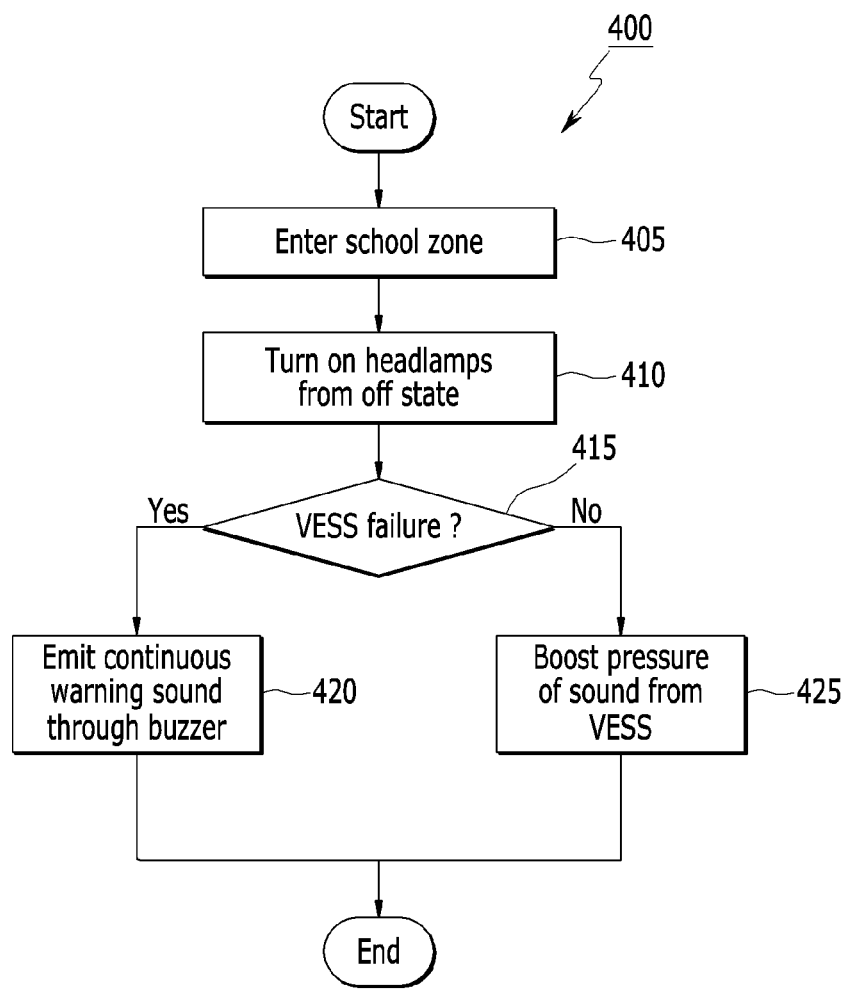
FIG. 6 is a flowchart showing a method for providing information about a failure in a VESS unit for a vehicle, explained with reference to FIG. 1 or FIG. 2, according to embodiments of the present disclosure.

FIG. 6 is a flowchart showing a method for providing information about a failure in a VESS unit for a vehicle, explained with reference to FIG. 1 or FIG. 2, according to embodiments of the present disclosure. The VESS unit failure information providing method 400 may be applied to either of the VESS unit failure information providing device 100 and the VESS unit failure information providing device of FIG. 2.

As shown in FIG. 6, in a vehicle entering step 405, the vehicle may enter an area (e.g., school zone) in which the vehicle must travel within a speed range where the VESS unit 130 is active. Information about the vehicle's entering a school zone may be provided by the navigation unit 120 of FIG. 1. The navigation unit 120 may include, for example, a global positioning system (GPS) to provide information about the vehicle entering a school zone.

In a headlamp turn-on step 410, when the vehicle enters a school zone, the vehicle's headlamps may be turned on from the off state. The headlamps may be controlled by the controller (or the VESS unit 130), or may be contained in the VESS unit failure information providing device.

In a VESS failure determination step 415, whether a failure has occurred or not in the VESS unit 130 is explained with reference to FIG. 1 or FIG. 2.

If the controller (e.g., controller included in VESS unit 130) determines that a failure has occurred in the VESS unit 130, a process corresponding to the VESS unit failure information providing method 400 may proceed to a warning sound emission step 420; otherwise, the process may proceed to a sound pressure boosting step 425.

In the warning sound emission step 420, a warning sound such as a continuous warning sound may be emitted through a buzzer in the vehicle that is activated by a remote key (or remote control key) for the vehicle that remotely controls the vehicle. The buzzer may be controlled by the controller, and may be contained in the VESS unit failure information providing device.

In the sound pressure boosting step 425, the sound pressure of the VESS unit 130 (or the speakers 210 and 215 connected to the VESS unit 130) may be boosted. The speakers may be controlled by the controller. More specifically, when the vehicle enters an area like a school zone in which the vehicle must travel at a low speed of up to 30 km/h, school zone information may be provided from the navigation unit 120 to boost the pressure of the sound currently emitted from the VESS, and the headlamps may be turned on to reduce the risk of accidents involving pedestrians. In case of a VESS failure, the buzzer (e.g., a speaker contained in the vehicle that is activated by a remote key for the vehicle) may be activated to protect pedestrians from the risk of vehicle accidents.

Figure 7:
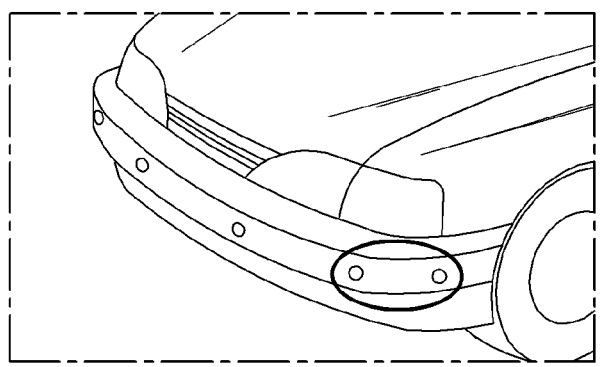
FIG. 7 is a view showing a vehicle's front sensor used in the VESS unit failure information providing method explained with reference to FIG. 1 or FIG. 2.
Figure 8:
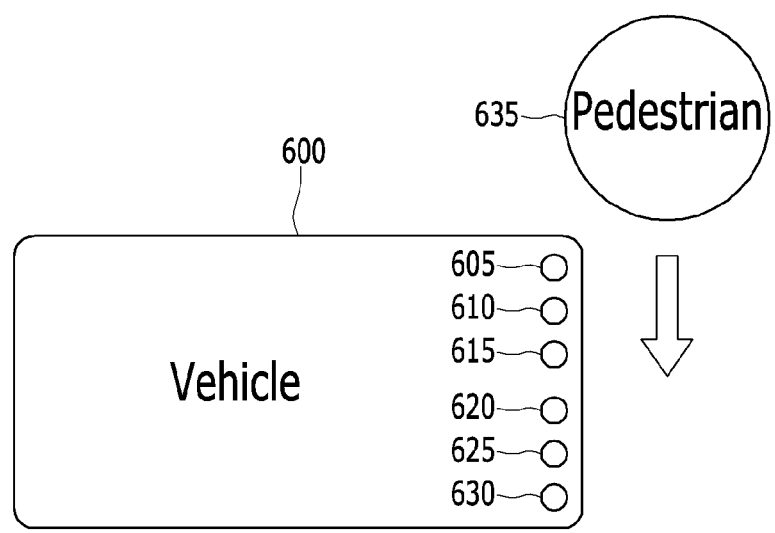
FIG. 8 is a view for explaining an example of the front sensor of FIG. 7.

FIG. 7 is a view showing a vehicle's front sensor used in the VESS unit failure information providing method explained with reference to FIG. 1 or FIG. 2. FIG. 8 is a view for explaining an example of the front sensor of FIG. 7.

Referring to FIGS. 7 and 8, when a front sensor or rear sensor of the vehicle shown in FIG. 7 detects an object outside the vehicle while the vehicle is traveling within a speed range where the VESS unit 130 is active, a buzzer in the vehicle that is activated by a remote key for remotely controlling the vehicle may emit a warning sound. The front sensor or rear sensor may be controlled by the controller (e.g., controller included in VESS unit 130), or may be contained in the VESS unit failure information providing device.

As shown in FIG. 8, the front sensor may include a plurality of motion sensors 605, 610, 615, 620, 625, and 630 located at the front of the vehicle, and if at least two of the motion sensors sequentially detect an object outside the vehicle, the object may be detected as moving. The motion sensors may include infrared sensors.

More specifically, when the vehicle travels at a speed of, e.g., 0 to 30 km per hour, which is required to activate the VESS unit, if the front sensor unit or rear sensor unit of the vehicle 600 shown in FIG. 7 detects an object outside the vehicle, such as a pedestrian, a warning sound may be immediately emitted through a buzzer (e.g., a speaker in the vehicle that is activated when a door unlock switch located on the remote key for the vehicle is pressed) to allow the pedestrian to be aware of the presence of the vehicle. The level of sound pressure of the buzzer may be lower than the level of sound pressure of the horn of the vehicle.

As shown in FIG. 8, the operation of detecting an external object such as a pedestrian 635 as moving using a signal input into the front sensor will be described below.

For instance, when a first sensor 605 detects an external objet such as the pedestrian 635 and then a second sensor 610 detects it, the external object may be identified as moving. The operation of the rear sensor may be similar to that of the front sensor.

The components, units, blocks, or modules used in the present exemplary embodiment may be implemented by software components, such as tasks, classes, subroutines, processes, objects, execution threads, or programs, or by hardware components, such as a Field Programmable Gate Array (FPGA) or an Application Specific Integrated Circuit (ASIC), or by combinations of the software and hardware components. The components may be included in a computer-readable storage medium, or some of the components may be distributed in a plurality of computers.

As described above, the optimum embodiments have been disclosed in the drawings and the specification. Although the specific terms have been used herein, they have been used merely for the purpose of describing the present disclosure, and have not been used to limit the meanings thereof and the scope of the present disclosure set forth in the claims. Therefore, it will be understood by those having ordinary knowledge in the art that various modifications and other embodiments can be made. Accordingly, the true technical protection range of this disclosure should be defined by the technical spirit of the attached claims.

DESCRIPTION OF SYMBOLS

105: cluster
115: CGW
120: navigation unit
130: VESS

What is claimed is:

1. A method for providing information about a failure in a virtual engine sound system (VESS) unit for a vehicle, the method comprising:
   sending a VESS unit failure message to a cluster;
   displaying the VESS unit failure message on the cluster;
   determining whether a speed of the vehicle is within a speed range where the VESS unit is active; and
   controlling the VESS unit failure message to be sent to the cluster only when the speed of the vehicle is within the speed range where the VESS unit is active.

2. The method of claim 1, further comprising:
   providing a diagnoser with a diagnostic trouble code (DTC), which is recognizable by a car repair shop, corresponding to the VESS unit failure message before sending the VESS unit failure message to the cluster.

3. The method of claim 1, further comprising:
   displaying, by a navigation unit of the vehicle, a VESS unit failure warning screen included in the VESS unit failure message only when the speed of the vehicle is within the speed range where the VESS unit is active.

4. The method of claim 1, further comprising:
   turning on headlamps of the vehicle when the vehicle enters an area in which the vehicle must travel within the speed range where the VESS unit is active.

5. The method of claim 4, further comprising:
   emitting a warning sound through a buzzer in the vehicle when the VESS unit sends a failure message after the turning on of the headlamps.

6. The method of claim 4, further comprising:
   boosting a pressure of a vehicle engine sound emitted from the VESS unit when the VESS unit does not send a failure message after the turning on of the headlamps.

7. The method of claim 1, further comprising:
   emitting a warning sound through a buzzer in the vehicle when a front sensor unit or a rear sensor unit of the vehicle detects an object outside of the vehicle while the vehicle is traveling within the speed range in which the VESS unit is active.

8. The method of claim 7, wherein:
   the front sensor unit includes a plurality of motion sensors located at a front of the vehicle, and
   the object is detected as moving when at least two of the plurality of motion sensors detect the object.

9. The method of claim 1, wherein a navigation unit of the vehicle displays route information for directing the vehicle to a car repair shop when the VESS unit sends the VESS unit failure message.

10. The method of claim 1, wherein the sending of the VESS unit failure message comprises:
    sending the VESS unit failure message to the cluster when a disconnection of wires connecting the VESS unit to speakers occurs.

11. A device for providing information about a failure in a virtual engine sound system (VESS) unit for a vehicle, the device comprising:
    a VESS unit emitting a virtual engine sound and sending a VESS unit failure message;
    a cluster receiving the VESS unit failure message from the VESS unit through a central gateway (GCW) and displaying the VESS unit failure message; and
    a controller determining whether a speed of the vehicle is within a speed range where the VESS unit is active and controlling the VESS unit failure message to be sent to the cluster only when the speed of the vehicle is within the speed range where the VESS unit is active.

12. The device of claim 11, further comprising:
    a diagnoser that receives a diagnostic trouble code (DTC), which is recognizable by a car repair shop, corresponding to the VESS unit failure message before sending the failure message to the cluster.

13. The device of claim 11, further comprising:
    a navigation unit that displays a VESS unit failure warning screen included in the VESS unit failure message sent by the VESS unit only when the speed of the vehicle is within the speed range where the VESS unit is active.

14. The device of claim 11, further comprising:
    a navigation unit that displays route information for directing the vehicle to a car repair shop when the VESS unit sends the VESS unit failure message.

15. The device of claim 11, wherein the VESS unit causes headlamps of the vehicle to be turned on when the vehicle enters an area in which the vehicle must travel within the speed range where the VESS unit is active.

16. The device of claim 15, wherein the VESS unit causes a warning sound to be emitted through a buzzer in the vehicle when the VESS unit sends a VESS unit failure message after the turning on of the headlamps.

17. The device of claim 15, wherein the VESS unit boosts pressure of a vehicle engine sound when the VESS does not send a VESS unit failure message after the turning on of the headlamps.

18. A non-transitory computer readable medium containing program instructions for providing information about a failure in a virtual engine sound system (VESS) unit for a vehicle, the computer readable medium comprising:
    program instructions that send a VESS unit failure message to a cluster;
    program instructions that display the VESS unit failure message on the cluster;
    program instructions that determine whether a speed of the vehicle is within a speed range where the VESS unit is active; and
    program instructions that control the VESS unit failure message to be sent to the cluster only when the speed of the vehicle is within the speed range where the VESS unit is active.

* * * * *